(12) United States Patent
LaRose

(10) Patent No.: US 9,696,009 B2
(45) Date of Patent: Jul. 4, 2017

(54) REFRIGERATED DISPLAY MERCHANDISER WITH LIGHT FILTER

(71) Applicant: Leo D. LaRose, Novi, MI (US)

(72) Inventor: Leo D. LaRose, Novi, MI (US)

(*) Notice: Subject to any disclaimer, the term of this patent is extended or adjusted under 35 U.S.C. 154(b) by 188 days.

(21) Appl. No.: 13/796,699

(22) Filed: Mar. 12, 2013

(65) Prior Publication Data

US 2014/0268793 A1    Sep. 18, 2014

(51) Int. Cl.

| | |
|---|---|
| *F21V 9/00* | (2015.01) |
| *F21V 9/06* | (2006.01) |
| *F21V 17/04* | (2006.01) |
| *G09F 13/04* | (2006.01) |
| *G02B 5/22* | (2006.01) |
| *G09F 13/22* | (2006.01) |
| *F21W 131/305* | (2006.01) |
| *F21W 131/405* | (2006.01) |
| *G09F 23/00* | (2006.01) |
| *F21Y 103/10* | (2016.01) |
| *F21Y 115/10* | (2016.01) |

(52) U.S. Cl.
CPC ............ *F21V 9/06* (2013.01); *F21V 17/04* (2013.01); *G02B 5/22* (2013.01); *G09F 13/04* (2013.01); *G09F 13/22* (2013.01); *F21W 2131/305* (2013.01); *F21W 2131/405* (2013.01); *F21Y 2103/10* (2016.08); *F21Y 2115/10* (2016.08); *G09F 2023/0033* (2013.01)

(58) Field of Classification Search
CPC ......... G09F 13/12; G09F 19/12; Y10S 362/81
USPC .......... 362/293, 311.06, 311.14, 812; 40/564
See application file for complete search history.

(56) References Cited

U.S. PATENT DOCUMENTS

| | | | | |
|---|---|---|---|---|
| 3,587,185 A | * | 6/1971 | Deal | ........................... 40/564 |
| 4,454,671 A | * | 6/1984 | Morgenstern | ....... G09F 15/0037 |
| | | | | 40/606.12 |
| 5,598,652 A | * | 2/1997 | Nurre | ..................... G09F 13/00 |
| | | | | 362/412 |
| 7,011,421 B2 | * | 3/2006 | Hulse et al. | ................... 362/84 |
| 7,096,625 B1 | * | 8/2006 | Hering | .................. E06B 11/08 |
| | | | | 49/42 |
| 7,360,374 B2 | | 4/2008 | Larose, Jr. | |
| 7,673,467 B2 | | 3/2010 | Larose, Jr. | |
| D614,704 S | * | 4/2010 | Ulrich | ........................... D20/42 |
| 7,832,918 B2 | * | 11/2010 | Chien | ......................... 362/641 |
| 7,871,192 B2 | * | 1/2011 | Chien | ......................... 362/641 |
| 8,084,115 B2 | * | 12/2011 | Lanzi | ....................... B44C 5/00 |
| | | | | 428/40.1 |
| 8,132,939 B2 | * | 3/2012 | Platzer et al. | ................ 362/293 |

(Continued)

*Primary Examiner* — Renee Chavez
*Assistant Examiner* — Tsion Tumebo
(74) *Attorney, Agent, or Firm* — The Weintraub Group, P.L.C.

(57) ABSTRACT

A filtering media for refrigerated display merchandiser for use with a refrigerated food merchandiser and which is ordinarily exposed to prevailing ambient light. The filtering media is at least a partial a cylindrical element that encircles a fluorescent light or LED light strip disposed within the merchandiser. A translucent sheet which functions as filter media to prevent harmful light from reaching the foods stuffs is disposed about the cylindrical element. The sheet is held in position via an arcuate element or with other means that retains the sheet in position. More than one sheet can be positioned on the cylindrical element which, itself, may be either transparent or translucent.

11 Claims, 2 Drawing Sheets

(56) References Cited

U.S. PATENT DOCUMENTS

| | | | |
|---|---|---|---|
| 8,256,151 B2* | 9/2012 | Stafford | G09F 7/18 40/606.12 |
| 8,777,445 B2* | 7/2014 | Gourdie | F21S 6/001 362/190 |
| 2002/0101733 A1* | 8/2002 | Emmel et al. | 362/217 |
| 2002/0145878 A1* | 10/2002 | Venegas, Jr. | F21S 8/083 362/431 |
| 2004/0075995 A1* | 4/2004 | Raggio | H01K 1/32 362/33 |
| 2006/0138916 A1* | 6/2006 | Kordon | 312/223.5 |
| 2006/0261291 A1* | 11/2006 | Gardner, III | 250/504 R |
| 2008/0266690 A1* | 10/2008 | Toda et al. | 359/885 |
| 2009/0212313 A1* | 8/2009 | Platzer et al. | 257/98 |
| 2010/0014288 A1* | 1/2010 | Kreutzer et al. | 362/231 |
| 2010/0195322 A1* | 8/2010 | Kawakami | F21S 2/00 362/231 |

* cited by examiner

REFRIGERATED DISPLAY MERCHANDISER WITH LIGHT FILTER

BACKGROUND OF THE INVENTION

1. Field of the Invention

The present invention pertains to a refrigerated merchandise enclosure having a view panel or area for displaying perishable food articles, and more particularly, to such an enclosure having a color filter for protecting perishable food articles from deterioration arising from a prolonged exposure to harmful light, whether interior or exterior to the enclosure, while permitting the articles to be clearly seen and discerned by a purchaser when looking at the refrigerated product in the merchandiser.

2. Description of the Prior Art

Modern displays of fresh foods are brightly lit in keeping with the idea that shoppers are attracted to and prefer bright displays, which in turn leads to improved sales volumes for retailers. What is less understood is the impact of this retail lighting on food safety, shelf life and the negative impact of using general lighting on perishable food products. Food does not last once it is exposed to light and radiation from heat in the store and artificial light sources. This is especially true for refrigerated products as they are the most sensitive to reduced shelf life from lighting and heat.

All food display lighting causes surface heating and promotes the photochemical process that contribute discoloration, oxidation (i.e., drying), and food borne pathogen growth. The brighter the light the greater the damage. As such, display lighting and ambient light around the display cabinet may be a source of damage to the safety and appearance of the products the seller is trying to merchandise. Desirably, a refrigerated merchandise display case would minimize harmful glaring light reaching the food product while serving to enhance the visibility and identity of the product promoted in the display case. Typically, food products in the refrigerated display case are illuminated by ambient daylight and by artificial lighting (e.g., fluorescent and incandescent lights) that is in the store (and exterior to the display case) and/or inside the display case thereby exposing the any food products to the deleterious effects of ultraviolet light which is emitted by the ambient and artificial light. In many applications, the artificial lighting hurts a fresh merchandise presentation by overpowering a display case with glaring light, causing products to appear washed out and unattractive while promoting pathogenic growth. Radiation from lighting works directly against the moisture and temperature controls in refrigerated display cases, dehydrating, oxidizing, and heating merchandise through invisible wavelengths. Studies show that lighting produces several types of radiation that can be damaging to specific products. Ultraviolet and infrared radiation, for example, is associated with surface drying and internal heating of merchandise. Further, certain parts of the visible spectrum, in particular those emphasized by regular fluorescents, can have damaging effects on fresh products, such as meat, where bacterial growth is a major concern.

An advantage of filtering harmful and damaging light from refrigerated food products is reduced shrinkage and extended shelf life without having to replace light sources. Reduced shrinkage, discoloration, and drying out of packaged food products correlates into fewer items that are thrown out due to drying or other damage.

In U.S. Pat. Nos. 7,360,374 and 7,673,467, the disclosures of which are hereby incorporated by reference, there is disclosed light filtering media which assist in maintaining the freshness of foodstuffs in various refrigerated displays. As disclosed in the afore mentioned the U.S. Letters Patent the invention thereof involve the utilization of a single filtering media in order to achieve their respective results. However, because of the different type of foodstuffs, which are typically maintained in a refrigerated display such as it is found in convenient stores, fueling stations, super markets the efficacy of the invention needs to expand. It is now been found that by deploying various colored translucent filtering media better or more enhanced stabilization of foodstuffs contained therewithin is achieved.

It should be noted that the present invention as detailed below is equally applicable to display merchandisers that do not have a door and/or viewing panel, but rather use "air curtains" otherwise known as open-faced coolers.

Moreover, by utilizing these translucent materials in combination with opaque materials, it is possible to incorporate various advertising media or the like therewithin while still achieving the purposes to which the present of the invention is directed.

In addition, it has now been found that by providing various "sized filtering media" better securement of the filtering media to associated fluorescent lamps is achieved.

SUMMARY OF THE INVENTION

In a first aspect hereof there is provided a multiple filtering media associated with the light for protecting perishable foods in a product display region of a display merchandiser from exposure to harmful effects of light of a predetermined frequency.

The filtering media protects the food products, such as prepackaged sandwiches, deli-meats, salads, and breads and comprises a plurality-of filtering transparent/translucent tubular elements having overlying sheets capable of passing light in predetermined ranges and absorbing light in all the other ranges secured thereto. The sheets are translucent, tinted or clear or transparent.

Depending on the perishable food products, the sheets according to this invention pass light in various spectra and preferably, the red range (about 620-780 nm), blue range (about 440-490 nm); as well as in the violet range (380-435 nm); the cyan range; the green range as well as, the yellow and orange ranges and absorb substantially all other light.

Further, the sheets according to this invention absorb light in the ultraviolet range (about 320-400 nm), such as UV-A light and UV-B light, which light has been a factor, in deteriorating the value of various commercial products.

The tubular elements are intended to surround fluorescent tubes, LED strips or other lighting which is typically disposed within such display devices.

Furthermore, where the sheets are planar sheets they can be disposed or removably mounted onto the front panel of food display devices including those disclosed in the aforementioned patents as well as used as coverings or "air curtains" for open-faced or open-topped coolers or refrigerated displays.

The present invention, also, includes means for securing the sheet(s) to the tubular element or strip and which comprises a tubular element having sufficient flexibility to enclose or cover and secure itself to the transparent tubular element while holding the sheet in place.

In a further aspect of the present invention there is provided refrigerated food displays which incorporate the filtering media in accordance herewith.

Preferably, the transparent sheets block about 98-99% of the UV-A and UV-B light while maintaining excellent clarity. Their attachment may be temporary, such as hung, or in encircling relation, such as around the fluorescent light tube, or by lamination thereatop.

In a preferred aspect, the transparent planar sheet has a minimum thickness of about 2 mils, enabling the sheet to be rolled, unrolled, and otherwise applied to both planar viewing windows as well as irregular surfaces.

In another embodiment, a display merchandiser for perishable articles of food comprises the filtering media herof.

For a more complete understanding of the present invention references is made to the following detailed description and accompany drawing. In the drawing like reference characters refer to like parts throughout the several views in which;

DETAILED DESCRIPTION OF THE PREFERRED EMBODIMENT

Figure 1:
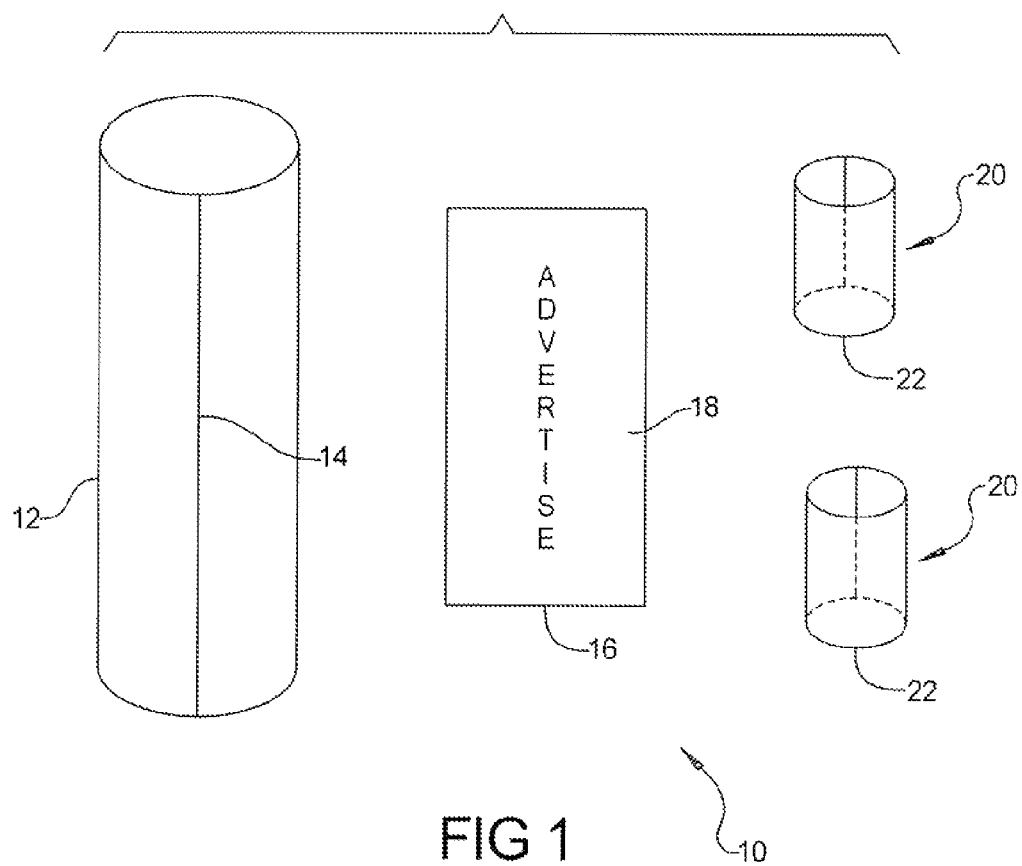
FIG. 1 is an exploded view of a first embodiment of the filter used in the present invention.

With reference to the drawing, there is depicted therein a light filter assemble in accordance with the present invention and generally denoted at 10.

As noted hereinabove and in the first embodiment hereof, the present invention comprises a substantially tubular element or cylinder or cylindrical element 12. The cylindrical element 12 is either a transparent or a translucent plastic element. A central seam or slit 14 enables the cylindrical element 12 to be opened sufficiently to enable it to encircle a fluorescent light or the like and to "snap back" into the position. The cylinder provides a first filtering media.

A translucent sheet 16 envelops the cylindrical element 12. The sheet 16 is substantially planar and is formed from any suitable color for filtering a selected portion of the light spectra emanating from the fluorescent light. The sheet 16 overlays the cylindrical element 12 and encircles it completely or at least a sufficient portion thereof to filter the light.

The sheet 16 may have suitable advertising indicia 18 or any similar announcement imprinted thereon.

Means for securing or retaining 20 secures the sheet 16 to the cylindrical element 12. The means for retaining 20, generally, comprises at least one and, preferably, a pair of spaced apart cylinders or cylindrical retainers 22, which have a length less than that of cylindrical element 12. The cylindrical retainers 22 are constructed similar to that of the cylindrical element 12 and have sufficient flexibility to envelop or encircle both the cylindrical element 12 and sheet 16. The cylindrical retainers 22 secure the sheet 16 in position. It should be noted that the cylindrical retainers 22 need not envelop and encircle the cylindrical element 12 in its entirety.

Figure 2:
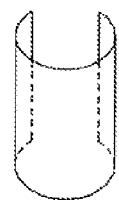
FIG. 2 is a perspective view of a retainer used herein.
Figure 3:
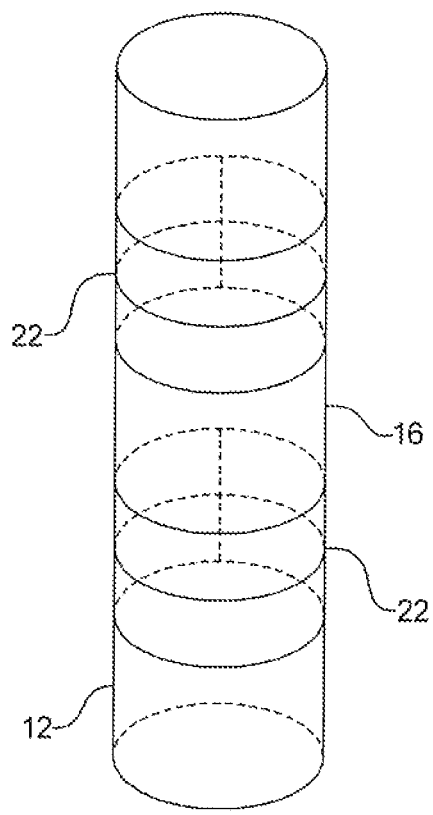
FIG. 3 is a plan view showing the use of multiple retainers and transparent sheets.
Figure 4:
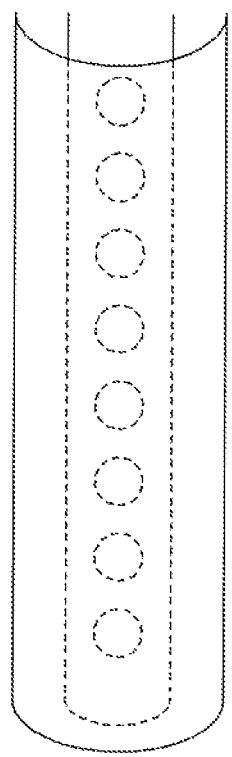
FIG. 4 is a plan view partly in phantom, of a second embodiment hereof used in connection with an LED strip.

As shown in FIG. 2 the cylinders 22 may be only a partial cylinder.

The cylinders 22 need only to exert sufficient tension on the sheet 16 to hold it in position.

It is to be understood, that multiple sheets can be used and emplaced along the extent of the cylindrical element 12. Furthermore, the sheets, per se, may be attached by other means including gluing, taping, static cling or the like.

As noted herein above the present invention is intended to be utilized in connection with the refrigerated display merchandisers shown and described in the above referred to '374 and '467 patents which are incorporated by reference herein, in to.

Having thus described the invention,

What is claimed is:

1. A filtering media for a refrigerated display merchandiser having either tubular fluorescent lighting or LED lighting disposed interiorly thereof, the filtering media comprising:
   (a) at least one partially cylindrical transparent element removably disposed about the lighting and in engagement with the lighting;
   (b) at least one translucent planar sheet of a first color wrapped about at least a portion of the cylindrical element, the translucent sheet being tinted to protect perishable food in the refrigerated display merchandiser from exposure to harmful effects of light of a predetermined frequency; and
   (c) means for retaining the sheet in position on the at least one cylindrical element, the means for retaining comprising at least one detachable cylindrical retainer positionable at any location along the at least one cylindrical element, the at least one cylindrical retainer being formed from a single substantially flexible material so as to fully envelop or partially envelop the sheet and in contact therewith thereby exerting sufficient tension on both the at least one sheet and the at least one cylindrical element in order to hold the sheet in place.

2. The filtering media of claim 1 wherein the means for retaining comprises a pair of spaced apart cylindrical retainers each enveloping and contacting at least a portion of the sheet.

3. The filtering media of claim 1 wherein the at least one cylindrical retainer is either transparent or translucent.

4. The filtering media of claim 1 wherein the sheet has advertising indicia imprinted thereon.

5. The filtering media of claim 3 wherein the at least one cylindrical retainer has advertising indicia imprinted thereon.

6. The filtering media of claim 1 which further comprises:
   a second translucent sheet of different color from that of the first translucent sheet, the second sheet being spaced apart from the first sheet along the exterior of the lighting.

7. The filtering media of claim 1 wherein the sheet has a minimum thickness from about 2 to about 20 mils and absorbs light in the spectrum range from about 320 nm to about 400 nm and passes light in the light spectra of from greater than about 400 nm to about 780 nm.

8. The filtering media of claim 1 wherein the sheet passes light in a range from about 620 to about 780 nm.

9. The filtering media of claim 1 wherein the sheet passes light in a range from about 440 to about 490 nm.

10. The filtering media of claim 1 wherein the sheet absorbs light in the ultraviolet range from about 320 to about 400 nm.

11. A filtering media for a refrigerated display merchandiser having a tubular fluorescent lighting or LED lighting disposed interiorly thereof, the filtering media comprising:
   (a) at least one translucent planar sheet of a first color overlying at least a portion of the lighting, the translucent sheet being tinted to protect perishable food in the refrigerated display merchandiser from exposure to harmful effects of light of a predetermined frequency; and (b) means for retaining the sheet in position about the lighting, the means for retaining comprising at least one detachable cylindrical retainer positionable at any location along the sheet, the at least one cylindrical retainer being formed from a single substantially flexible material so as to at least partially envelop the sheet and be in contact therewith thereby exerting sufficient tension on both the at least one sheet and the lighting in order to hold the sheet in place.

* * * * *